US012806740B1

(12) United States Patent
Perot

(10) Patent No.: US 12,806,740 B1
(45) Date of Patent: Nov. 24, 2026

(54) PORTABLE PIPE GRIPPING TORQUE VISE

(71) Applicant: Christopher Perot, Bellaire, TX (US)

(72) Inventor: Christopher Perot, Bellaire, TX (US)

( * ) Notice: Subject to any disclaimer, the term of this patent is extended or adjusted under 35 U.S.C. 154(b) by 307 days.

(21) Appl. No.: 17/508,980

(22) Filed: Oct. 23, 2021

Related U.S. Application Data

(60) Provisional application No. 63/104,525, filed on Oct. 23, 2020.

(51) Int. Cl.
*B25B 1/00* (2006.01)
*B25B 1/20* (2006.01)
*B25B 1/24* (2006.01)

(52) U.S. Cl.
CPC .............. *B25B 1/20* (2013.01); *B25B 1/2484* (2013.01)

(58) Field of Classification Search
CPC .... B25B 1/00; B25B 1/02; B25B 1/04; B25B 1/20; B25B 5/00; B25B 5/04; B25B 5/02; B25B 11/00; B25B 11/02; B23Q 3/00; F16L 3/00; F16L 13/00
See application file for complete search history.

(56) References Cited

U.S. PATENT DOCUMENTS 328,102 A 10/1885 Bauer
342,992 A 6/1886 Baker
348,818 A 9/1886 Baker
1,108,519 A 8/1914 Reese
1,198,365 A 9/1916 Manney
1,302,220 A 4/1919 Reese
1,941,889 A 1/1934 Freeman
2,102,287 A * 12/1937 Smethers ................ B25B 13/18 81/339
2,637,235 A 5/1953 Licari
9,352,457 B2 * 5/2016 MacFarlane ............ B25B 23/00
12,138,762 B1 * 11/2024 Neill ........................ B25B 7/123
2006/0156873 A1 * 7/2006 Ruiz ........................ B25B 11/00 81/462
2007/0080265 A1 * 4/2007 Schaffer ................ F16L 3/1025 248/65
2010/0116947 A1 * 5/2010 Winkler .................. F16L 3/243 248/74.1
2010/0242686 A1 * 9/2010 Gower ...................... B25B 7/04 81/185.1
2026/0109010 A1 * 4/2026 Perot ................... B25B 23/0028
2026/0146687 A1 * 5/2026 van der Schyff ..... F16L 3/1211

* cited by examiner

*Primary Examiner* — Lee D Wilson
(74) *Attorney, Agent, or Firm* — HULSEY P.C.

(57) ABSTRACT

A portable pipe gripping torque vise having a support base configured to be removably mounted and supported on various work surfaces, and an integrally formed pedestal extending upwardly perpendicular to the support base that carries a fixed arcuate upwardly curved toothed bottom jaw and a pivotal spring biased upper jaw having two adjacent toothed jaw surfaces disposed at an angle relative to one another that grip and securely hold pipe and fittings of different sizes to effectively resist torque forces as the pipe or fitting is rotated to screw them together or to unscrew them.

9 Claims, 4 Drawing Sheets

PORTABLE PIPE GRIPPING TORQUE VISE

CROSS REFERENCE TO RELATED APPLICATION

This application claims priority of U.S. Provisional Application Ser. No. 63/104,525 filed Oct. 23, 2020, the pendency of which is extended until Oct. 25, 2021 under 35 U.S.C 119 (c) (3).

BACKGROUND OF THE INVENTION

1. Field of the Invention

This invention relates generally to work holding vises and, more particularly, to a portable pipe gripping torque vise having a support base configured to be removably mounted and supported on various work surfaces, and an integrally formed pedestal extending perpendicular to the support base that carries a fixed arcuate toothed jaw and a pivotal jaw having two adjacent toothed jaw surfaces disposed at an angle relative to one another that grip and securely hold pipe and fittings of different sizes to effectively resist torque forces as the pipe or fitting is rotated to screw them together or to unscrew them.

2. Background Art

In plumbing or other mechanical work it is often necessary to screw together or unscrew threaded pipe and fittings such as elbows, nipples, nuts, etc. In some instances when connecting and disconnecting the threaded pipe connections and fittings, either the pipe or the fitting is tightly clamped between the jaws of a conventional bench mounted vise, and the other of the pipe or fitting is gripped and rotated by a pipe wrench. Depending upon the material, the member tightly clamped in the vise can be deformed or badly scored.

In some instances, when a vise is not available, two pipe wrenches may be used wherein either the pipe or the fitting is gripped by a first pipe wrench and other of the pipe or fitting is gripped and rotated by a second pipe wrench. This procedure is very difficult to be accomplished by a single person using one hand to grip and support either the pipe or the fitting with one pipe wrench, and using their other hand to grip, support, and rotate, either the pipe or the fitting with the other pipe wrench. Some workers set the first wrench on a floor, bench, or any other suitable surface in an upright and lengthwise position and use the second wrench other to grip, support, and rotate, either the pipe or the fitting. However, it is still a difficult and cumbersome task because it is difficult maintain the first wrench in an upright position while being used in the manner described because of the narrow supporting area equivalent to the thickness and length of the wrench.

There are several patents directed toward vises of various constructions for gripping pipe or pipe fittings. The following are several examples.

Bauer, U.S. Pat. No. 328,102, discloses a self-gripping pipe vise having one or more movable jaws toothed at one end and pivoted at the other end to a connecting body or link in such a manner that when the pipe or other article to be operated upon is placed between the toothed parts of the jaws and are opposite to one another, it is firmly held by them on account of the leverage brought to bear upon the pivot at the other end. The distance from the pivot to the opposite side or parts of the jaws increases or diminishes as the jaw is being moved on its pivot one way or the other Baker, U.S. Pat. No. 342,992 and 348,818, disclose a pipe and rod vise having a frame with yoke shaped body mounted on a stem having a flattened base and V shaped jaws formed on the body. A vertical opening is formed in the upper part of the frame and a sliding block is received in the opening which carries a pivoted gripping jaw at its lower end and is provided with a hook or handle at its upper end for raising the block to free the pipe or other object from the vise. Ratchet teeth are formed on one side of the sliding block which are adapted to engage a toothed locking-pawl pivoted to the frame and acted on at its rear by a handled cam also pivoted to the frame so as to engage the locking pawl. The pivoted gripping-jaw at the lower end of the block is provided with two sets of teeth facing in opposite directions, so that, no matter in which direction the strain on the pipe or other object may be, the latter will be always firmly gripped by the jaw.

Reese, U.S. Pat. No. 1,108,519, discloses a pipe vise having a base plate which is bolted to a bench or support. The base plate has fixed or fulcrum ears or uprights between which an arcuate jaw having teeth is pivoted and a handle at the outer end of the jaw for manipulating the jaw and which also serves as a weight to hold the jaw to the work piece. A second pair of ears or uprights project from a slide which travels in the base plate and carries a second jaw having oppositely presented teeth which is arranged to swing opposite the first jaw. The ears or uprights are beveled to form a V-notch or seat for the pipe or work piece. The pipe or rod is laid across the seat and one or both of the jaws are pressed into contact therewith, the teeth engaging the work to prevent the same from turning while it is being threaded or otherwise operated on.

Manney, U.S. Pat. No. 1,198,365, discloses a pipe vise having a base plate which may be bolted to a bench or support and is provided with an integrally formed vise frame consisting of two angular, outwardly projecting members that are spaced apart to form a substantially rectangular shaped opening adapted to receive a pipe and having one side and one end thereof provided with teeth that are graduated in size to form an angular pipe gripping jaw. The smaller teeth are adjacent to the intersection of the two sides of the jaw whereby a pipe of small diameter may be more securely gripped. A heart-shaped double faced cam is disposed within a slot defined by the outwardly projecting members pivotally mounted the outwardly projecting members such that it may be turned to any desired position within the slot. The edge of the cam is provided with teeth that are descendingly graduated in size from the larger top portion of the cam to the point thereof and are adapted to co-act with the teeth of the angular surfaces of the rectangular opening to grip the pipe, and the point of the cam is adapted to move in the slot when rotated about the pivot connection.

Reese, U.S. Pat. No. 1,302,220, discloses a pipe vise having a base plate which is bolted to a bench or support. This plate has fixed upright seat members, the upper ends of which are V-shaped and provided with serrated face plates, the teeth of which are oppositely presented to grip both ways, the pipe resting on the face plates. A pair of arcuate jaws having oppositely presented teeth are each pivoted to a respective upright seat member and each has an adjustable weight at its outer end which also serves as a handle for manipulating the jaw to hold the jaw to the work piece. The jaws swing opposite to one another to engaging the pipe to prevent the same from turning.

Freeman, U.S. Pat. No. 1,941,889, discloses a pipe clamping device vise embodied in a cradle that forms a rest or support for an adjustable jawed pipe wrench, such as a Stillson type wrench. The cradle comprises an upright rest and a spaced rearwardly extending holder and rest joined to the upright rest by connecting links or stays. The wrench is placed in the cradle and the handle of the wrench is held in the holder which is provided with a socket or suitable receptive portion to receive it and is firmly held in place therein by a set screw. The movable jaw of the wrench rests in a downwardly inclined recess formed in the top of the upright rest and is held therein by a strap which bridges the jaw. The wrench is supported in cradle in an inclined position. The rearwardly extending holder may be of considerable length, whereby the effective length of the wrench handle is increased and the downward pressure exerted by it due to the wrench resisting rotation of the pipe is decreased.

Licari, U.S. Pat. No. 2,637,235, discloses a support means for slidable jaw wrenches for supporting the wrench with its jaws disposed in an upright position on a suitable surface, to enable the wrench to act as an auxiliary vise to one part of a pipe connection in the vise and either tighten or loosen a coupling. In one embodiment, a conventional wrench structure having a head portion and an extended handle portion is provided with an elongated cutout located on the underside of the head portion and extended in the direction of the handle portion, and an elongated support arm generally conforming to the cutout in shape and dimensions and having a flat base for contact with a supporting surface is pivotally mounted on the head portion of the wrench within the cutout, whereby the arm may be swung to a laterally extended position to act in conjunction with the wrench handle as a support for the wrench on a flat surface, with the wrench jaws facing upward. In a second embodiment, the elongated support arm is longer than the length of the transverse portion of the cutout to extend laterally from both sides of the head portion.

SUMMARY OF THE INVENTION

The present invention overcomes the aforementioned problems and is distinguished over the prior art in general, and these patents in particular, by a portable pipe gripping torque vise having a support base configured to be removably mounted and supported on various work surfaces, and an integrally formed pedestal extending upwardly from the support base. An arcuate bottom jaw is mounted at the top end of the pedestal and has an arcuate upwardly curved toothed face. The upper end of the pedestal has yoke with a vertical flat shoulder and a pair of parallel laterally spaced mounting ears extending a short distance outward therefrom toward a first end of the base plate. The mounting ears are provided with axially aligned transverse holes that receive a pivot pin. One end of the pivotal jaw member is pivotally mounted between the mounting ears of the yoke by a pivot pin secured by a snap ring.

The pivotal jaw has two adjacent toothed jaw surfaces on the underside thereof that are disposed at an angle relative to one another that grip and securely hold pipe and fittings of different sizes to effectively resist torque forces as the pipe or fitting is rotated to screw them together or to unscrew them. More particularly, the pivotal jaw has a first toothed jaw face disposed in an upwardly curved plane and a second toothed jaw face is disposed in a wide inverted “V” shaped plane and they are adjoined by an intermediate short V-shaped serrated toothed surface.

A torsion spring is installed on the pivot pin and has a U-shaped end engaged on the vertical flat shoulder in the yoke portion of the pedestal and a pair of legs that encircle the pivot pin on opposite sides of the mounting end of the pivotal jaw member and their ends are engaged against a raised shoulder on the jaw member. The torsion spring biases the pivotal jaw member toward a closed position and is adapted to be manually pivoted from the closed position to an open position.

In use, the pipe gripping torque vise is removably mounted and supported on various work surfaces. The pivotal jaw member is pivoted from a closed position to an open position. Either of a pipe or pipe fitting is placed on the arcuate bottom jaw, and the pivotal jaw member is released such that it’s angularly disposed toothed first or second jaw faces engage the top of the pipe or fitting supported on the toothed surface of the bottom jaw and are biased into firm engagement by the torsion spring. Thus, the pipe or fitting is encompassed and gripped at circumferentially spaced locations by the arcuate bottom jaw, and the first and second jaw faces of the pivotal jaw member.

A pipe wrench is used to grip and rotate either the unsupported pipe or fitting to screw them together or to unscrew them. The rotational force is applied in the direction of the of the pivot pin. As the rotational force is applied, a clamping effect is provided by the toothed surfaces of the arcuate bottom jaw, and the first and second jaw faces of the pivotal jaw member to resist rotation of the clamped member. Therefore, the pipe or fitting is gripped more effectively and the gripping pressure is increased as force is applied in a torque direction. The support base also provides stability and resistance to the rotational force and allows increased leverage and torque to be applied by the pipe wrench.

DETAILED DESCRIPTION OF THE INVENTION

Figure 1:
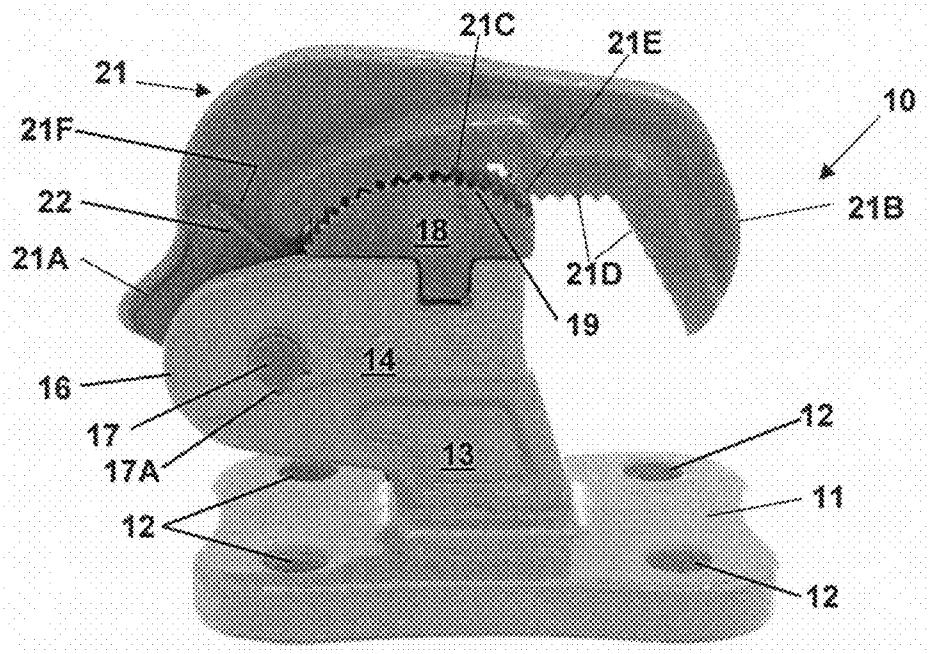
FIG. 1 is a side elevation view of a first embodiment of the portable pipe gripping torque vise in accordance with the present invention, shown with the pivotal jaw member in a closed position.

As used herein, the terms “top”, “bottom”, “vertical”, “vertically”, “upwardly”, “upper”, and “lower” refer to the direction or orientation relative to the support base when in a horizontal plane, as shown in FIG. 1.

Referring now to the drawings by numerals of reference, there is shown in FIGS. 1-4, a first embodiment of the portable pipe gripping torque vise 10 in accordance with the present invention. The portable pipe gripping torque vise 10 has a generally rectangular support base 11 formed of a metal material having holes 12 near the corners thereof configured to receive a threaded bolt for mounting and supporting the vise on various support surfaces.

An integrally formed pedestal 13 extends a short distance upward from the top surface of the support base 11. The upper end of the pedestal 13 has a yoke portion 14 defined by a vertical flat shoulder 15 and a pair of parallel laterally spaced mounting ears 16 extending a short distance outwardly therefrom toward an end of the support base 11. The mounting ears 16 of the yoke portion 14 are each provided with a transverse hole disposed in axially aligned laterally opposed relation for receiving a pivot pin 17 (described hereinafter).

An arcuate bottom jaw 18 is secured to the top end of the pedestal 13 above the yoke portion 14 and has an upwardly curved arcuate face 19 provided with a plurality of serrated teeth 20 which extend transversely across, and radially outwardly from, the arcuate face. A curved pivotal jaw member 21 having a mounting end 21A and a jaw end 21B is pivotally mounted at the mounting end 20 between mounting the ears 16 of the yoke portion 15 by the pivot pin 17. The underside of the pivotal jaw member 21 is provided with first and second jaw faces 21C, 21D, disposed adjacent to one another, and at an angle relative to one another, each having a plurality of serrated teeth, respectively which extend transversely across, and downwardly from, the jaw faces. More particularly, the first toothed jaw face 21A is disposed in an upward slightly curved plane and the second toothed jaw face 21B is disposed in a wide inverted “V” shaped plane and they are adjoined by an intermediate short V-shaped serrated toothed surface 21C.

Figure 2:
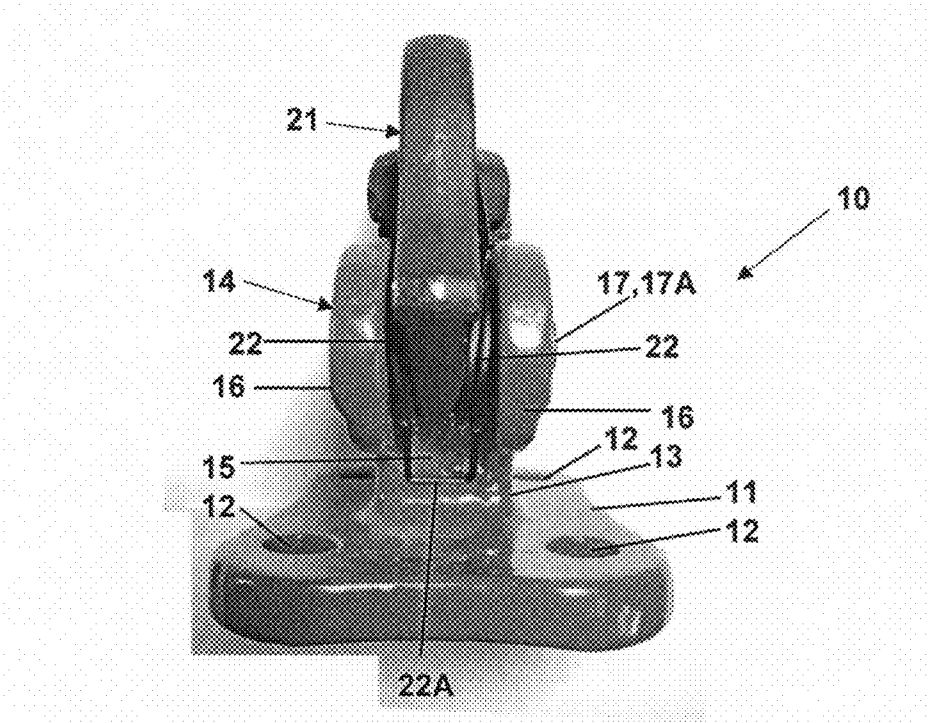
FIG. 2 is an end elevation view of the portable pipe gripping torque vise of FIG. 1, showing the spring mounting arrangement.

The mounting end 21A of the pivotal jaw member 20 is received between the mounting ears 16 and pivotally mounted on the yoke portion 15 of the pedestal 14 by the pivot pin 17 which extends through the mounting ears 16, which provides a pivot axis. The pivot pin 17 is secured by a snap ring 17A. As best seen in FIG. 2, a torsion spring 22 has a U-shaped end 22A engaged on the vertical flat shoulder 15 in the yoke portion 14 of the pedestal 13 and a pair of legs extending therefrom that are coiled around the pivot pin 18 on opposite sides of the mounting end 21A of the pivotal jaw member 21 and their ends are engaged against a raised shoulder 21F on the jaw member. Thus, the torsion spring 22 biases the pivotal jaw member 21 toward the closed position shown in FIG. 1.

Figure 3:
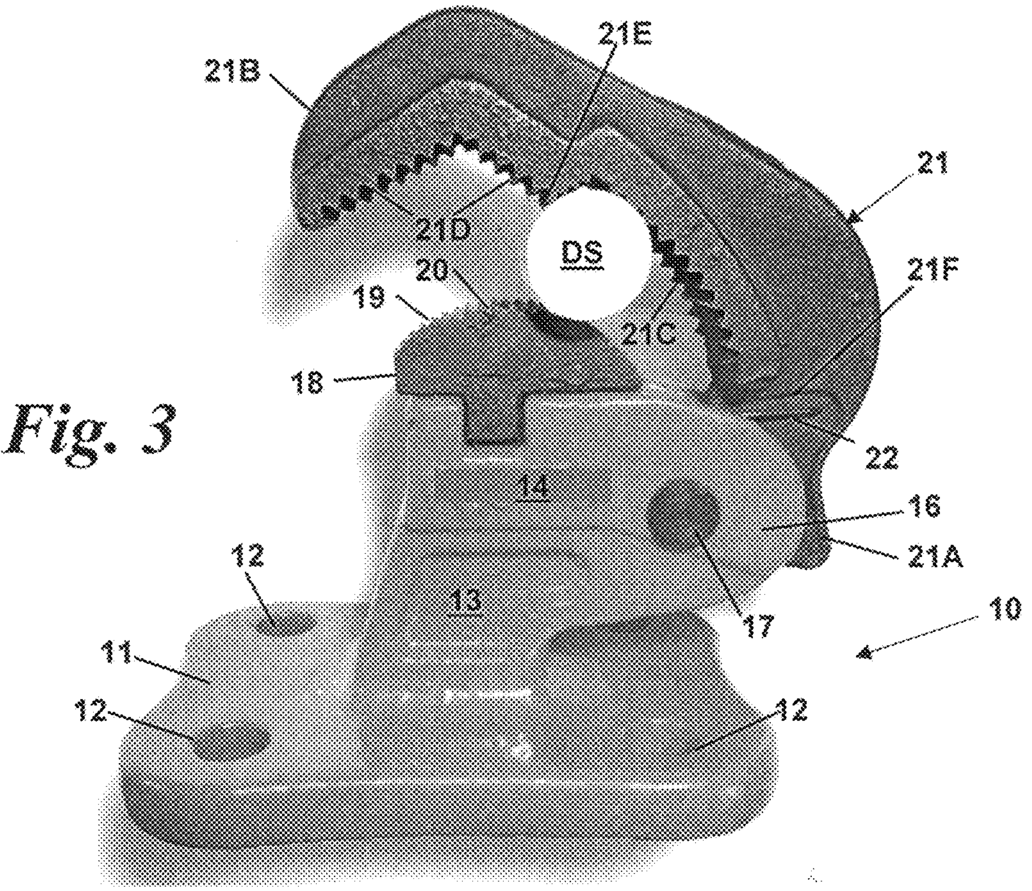
FIG. 3 is a side elevation view of the portable pipe gripping torque vise of FIG. 1, shown from the opposite side with the pivotal jaw member in an open position gripping a smaller diameter pipe or pipe fitting between the arcuate bottom jaw member and the pivotal jaw member.
Figure 4:
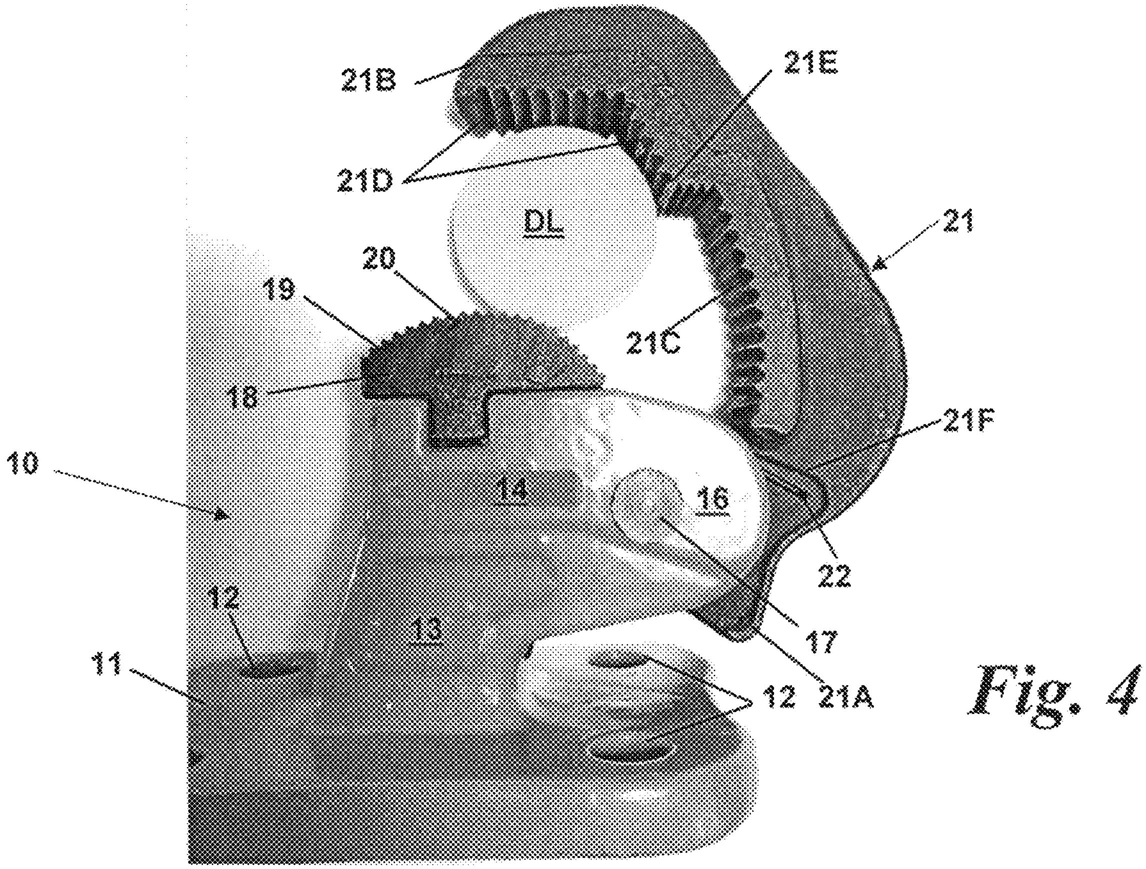
FIG. 4 is a side elevation view of the portable pipe gripping torque vise of FIG. 1, shown from the opposite side with the pivotal jaw member in an open position gripping a larger diameter pipe or pipe fitting between the arcuate bottom jaw member and the pivotal jaw member.

The pivotal jaw member 21 is adapted to be manually pivoted about the pivot pin 17 from a closed position shown in FIG. 1 to a spring biased open gripping position for gripping pipe or fittings of different size. For example, the jaw member 21 is shown in FIG. 3 gripping a smaller diameter circular member D1 between the arcuate bottom jaw 18 and the first jaw face 21C, and shown in FIG. 4 gripping a larger diameter circular member D2 between the arcuate bottom jaw 18 and the second jaw face 21D.

This embodiment of the of the portable pipe gripping torque vise may be easily mounted and secured to a work table, a vehicle bumper, the tongue of a trailer hitch, a trailer, a service carts, or even a wall, and is suitable for use in gripping circular members having an outside diameter ranging from about ⅜" to about 2".

A pipe wrench is used to grip and rotate either the unsupported pipe or fitting to screw them together or to unscrew them. The rotational force is applied in the direction of the pivot connection. As the rotational force is applied, a clamping effect is provided by the three toothed surfaces of the arcuate bottom jaw 18, and the first or second jaw faces 21C or 21D, of the pivotal jaw member 21 to resist rotation of the clamped member. Therefore, the pipe or fitting is gripped more effectively and the gripping pressure is increased as force is applied in a torque direction. The surface area and mounting arrangement of the base 11 also provides stability and resistance to the rotational force and allows increased leverage and torque to be applied by the pipe wrench.

Figure 5:
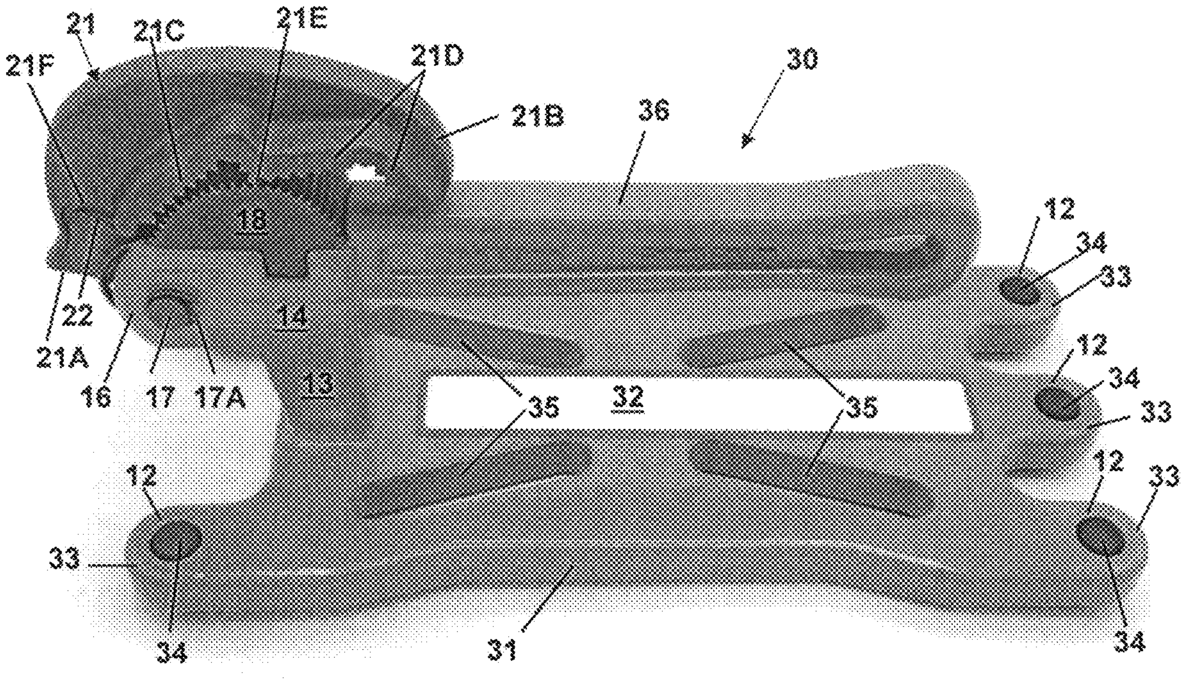
FIG. 5 is a side elevation view of a second embodiment of the portable pipe gripping torque vise in accordance with the present invention having an elongated and wider support base, shown with the pivotal jaw member in a closed position.

Referring now to FIG. 5, there is shown a second embodiment of the portable pipe gripping torque vise 30 in accordance with the present invention. The components that are the same as those previously described above are assigned the same numerals of reference, but some of the components may not be shown or described again in detail to avoid repetition. This embodiment has an elongated and wider support base 31.

The pipe gripping torque vise 30 has a generally rectangular support base 31 with an elongate a central portion 32 having a pair of integrally formed mounting legs 33 extending horizontally outward from a first end thereof and three integrally formed mounting legs 33 extending horizontally outward from the opposed second end thereof in the same plane as the central portion and holes 12 near the outer ends of the mounting legs. In the illustrated example, rubber foot pads 34 are shown installed in the mounting leg holes 12, however it should be understood that, alternatively, threaded bolts may be installed through the holes 12 for mounting and supporting the vise on various support surfaces. The support base 31 may be provided with slots 35 extending therethrough to reduce weight.

As with the previously described embodiment, an integrally formed pedestal 13 extends a short distance upward from the top surface of the support base 31 near one end thereof. The upper end of the pedestal 13 has a yoke portion 14 defined by a vertical flat shoulder (shown previously in FIG. 2) and a pair of parallel laterally spaced mounting ears 16 extending a short distance outwardly therefrom toward an end of the support base 31. The mounting ears 16 of the yoke portion 14 are each provided with a transverse hole disposed in axially aligned laterally opposed relation for receiving a pivot pin 17 which is secured by a lock washer 17A.

In this embodiment, an integrally formed elongated handle 36 extends a distance horizontally outward from the yoke portion 14 of the pedestal 12 above the support base 31 and toward the second end thereof.

As with the previously described embodiment, an arcuate bottom jaw 18 is secured to the top end of the pedestal 13 above the yoke portion 14 and has an upwardly curved arcuate face 19 provided with a plurality of serrated teeth 20 which extend transversely across, and radially outwardly from, the arcuate face. A curved pivotal jaw member 21 having a mounting end 21A and a jaw end 21B is pivotally mounted at the mounting end 20 between mounting the ears 16 of the yoke portion 15 by the pivot pin 17. The underside of the pivotal jaw member 21 is provided with first and second jaw faces 21C and 21D, disposed adjacent to one another, and at an angle relative to one another, each having a plurality of serrated teeth, respectively which extend transversely across, and downwardly from, the jaw faces. More particularly, the first toothed jaw face 21A is disposed in an upward slightly curved plane and the second toothed jaw face 21B is disposed in a wide inverted "V" shaped plane and they are adjoined by an intermediate short V-shaped serrated toothed surface 21C.

As previously described and shown reference to FIG. 2, a torsion spring 22 having a U-shaped end 22A engaged on the vertical flat shoulder 15 in the yoke portion 14 of the pedestal 13 and a pair of legs extending therefrom that are coiled around the pivot pin 18 on opposite sides of the mounting end 21A of the pivotal jaw member 21 and their ends are engaged against a raised shoulder 21F on the jaw member. Thus, the torsion spring 22 biases the pivotal jaw member 21 toward the closed position.

This embodiment of the of the portable pipe gripping torque vise may be easily carried and transported by the elongates handle, and mounted and secured to a work table, a trailer, a service cart, and is suitable for use in gripping circular members having an outside diameter ranging from about ⅜" to about 1.75".

Figure 6:
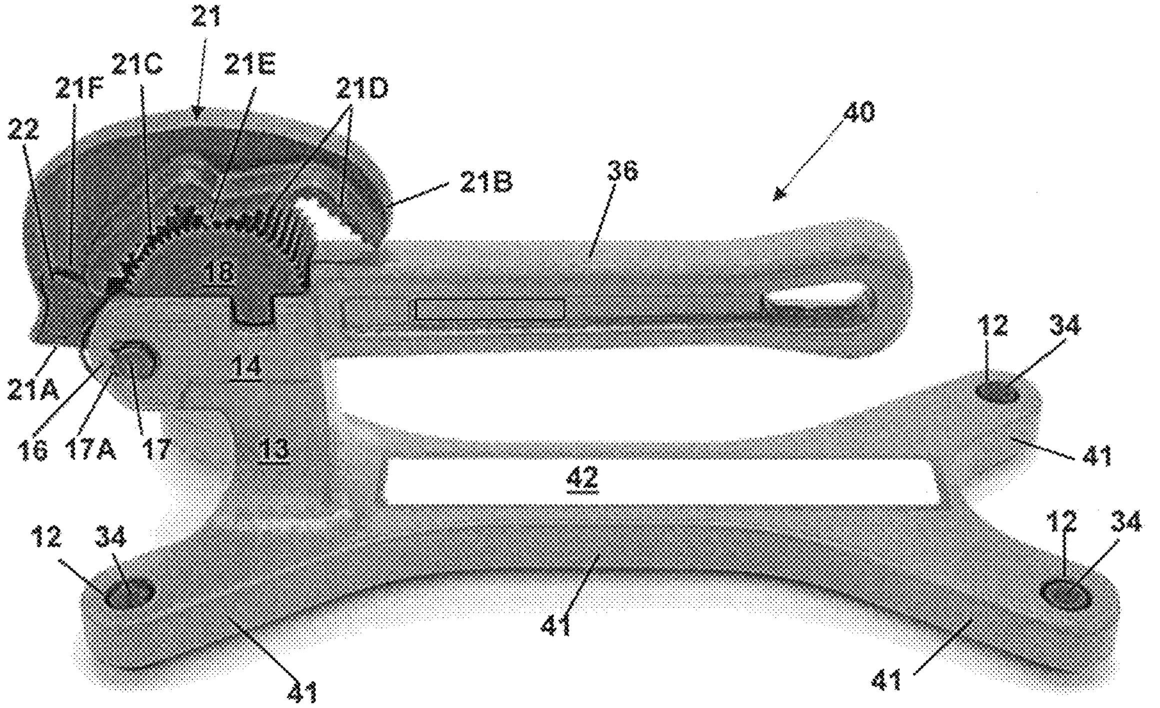
FIG. 6 is a side elevation view of a third embodiment similar to the second embodiment of the portable pipe gripping torque vise in accordance with the present invention formed of aluminum and having an narrower support base, shown with the pivotal jaw member in a closed position.

Referring now to FIG. 6, there is shown a third embodiment of the portable pipe gripping torque vise 40 in accordance with the present invention, shown with the pivotal jaw member in a closed position. This embodiment is similar to the embodiment of FIG. 5, but is a lightweight version wherein the support base and the vertical pedestal are formed of aluminum and it has a narrower support base. The components that are the same as those previously described above with reference to the previous embodiments are assigned the same numerals of reference, but some of the components may not be shown or described again in detail to avoid repetition.

The pipe gripping torque vise 40 has a generally rectangular support base 41 formed of aluminum with a central main portion 42 having a pair of integral mounting legs 43 diverging a short distance angularly outwardly from opposed first and second ends thereof in the same plane as the central portion and holes 12 near the outer ends of the mounting legs. In the illustrated example, rubber foot pads 44 are shown installed in the mounting leg holes 12, however it should be understood that, alternatively, threaded bolts may be installed through the holes 12 for mounting and supporting the vise on various support surfaces.

As with the previously described embodiment an integrally formed pedestal 13 extends a short distance upward from the top surface of the support base 41 near one end thereof, and an elongated handle 36 extends a distance horizontally outward from the pedestal 13 above the support base 41 and toward the second end thereof. The upper end of the pedestal 13 has a yoke portion 14 defined by a vertical flat shoulder (as shown previously in FIG. 2) and a pair of parallel laterally spaced mounting ears 16 extending a short distance outwardly therefrom toward an end of the support base 31. The mounting ears 16 of the yoke portion 14 are each provided with a transverse hole disposed in axially aligned laterally opposed relation for receiving a pivot pin 17 which is secured by a lock washer 17A.

As with the previously described embodiments, an arcuate bottom jaw 18 is secured to the top end of the pedestal 13 above the yoke portion 14 and has an upwardly curved arcuate face 19 provided with a plurality of serrated teeth 20 which extend transversely across, and radially outwardly from, the arcuate face. A curved pivotal jaw member 21 having a mounting end 21A and a jaw end 21B is pivotally mounted at the mounting end 20 between mounting the ears 16 of the yoke portion 15 by the pivot pin 17. The underside of the pivotal jaw member 21 is provided with first and second jaw faces 21C and 21D, disposed adjacent to one another, and at an angle relative to one another, each having a plurality of serrated teeth, respectively which extend transversely across, and downwardly from, the jaw faces. More particularly, the first toothed jaw face 21A is disposed in an upward slightly curved plane and the second toothed jaw face 21B is disposed in a wide inverted "V" shaped plane and they are adjoined by an intermediate short V-shaped serrated toothed surface 21C.

As previously described and shown reference to FIG. 2, a torsion spring 22 having a U-shaped end 22A engaged on the vertical flat shoulder 15 in the yoke portion 14 of the pedestal 13 and a pair of legs extending therefrom that are coiled around the pivot pin 18 on opposite sides of the mounting end 21A of the pivotal jaw member 21 and their ends are engaged against a raised shoulder 21F on the jaw member. Thus, the torsion spring 22 biases the pivotal jaw member 21 toward the closed position.

This embodiment of the of the portable pipe gripping torque vise may fit in most any tool bag, and be easily carried and transported by the elongate handle and is suitable for use in gripping circular members having an outside diameter ranging from about ⅜" to about 1.75".

Figure 7:
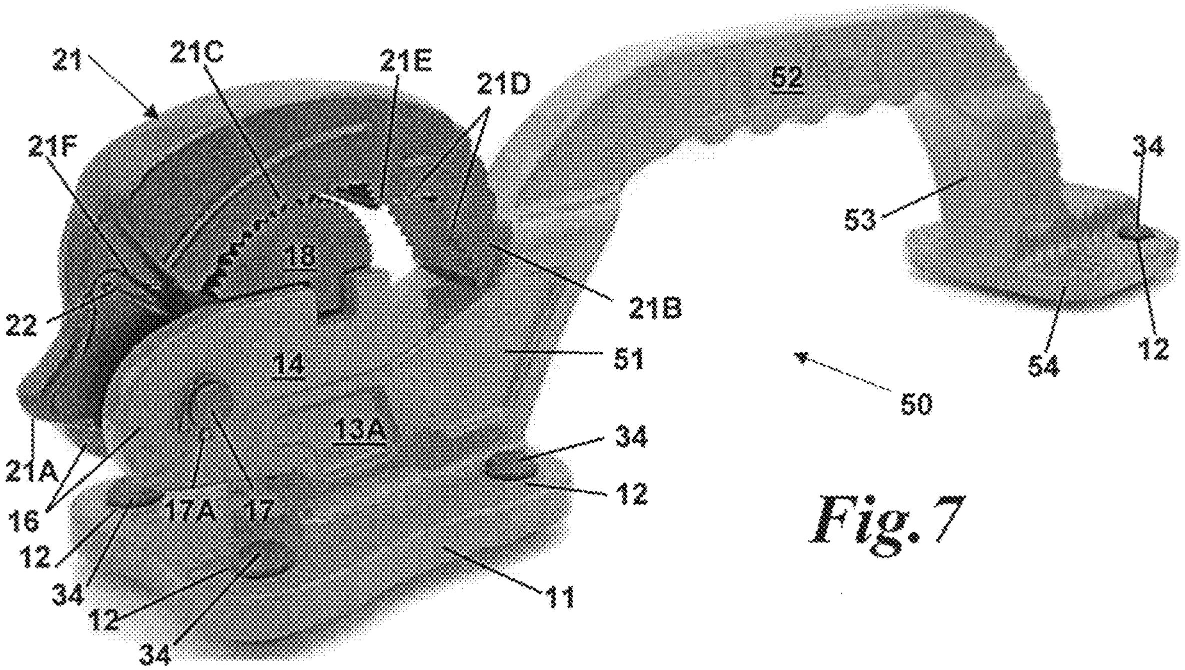
FIG. 7 is a side elevation view of a fourth embodiment of the portable pipe gripping torque vise in accordance with the present invention having a support base similar to the embodiment of FIG. 1, but having a modified pedestal with an elongate gripping handle extending horizontally outward therefrom with a downturned outer end terminating in a support foot in the same plane as the support base.

Referring now to FIG. 7, there is shown a fourth embodiment of the portable pipe gripping torque vise 50 in accordance with the present invention, shown with the pivotal jaw member in a closed position. This embodiment has a support base similar to the first embodiment of FIGS. 1-4, but having a modified pedestal 13A with an elongate gripping handle extending horizontally outward therefrom with a downturned outer end terminating in a support foot in the same plane as the support base. The components that are the same as those previously described above with reference to the previous embodiments are assigned the same numerals of reference, but some of the components may not be shown or described again in detail to avoid repetition.

As shown in FIG. 7, this embodiment of the portable pipe gripping torque vise 50 has a generally rectangular support base 11 formed of a metal material having holes 12 near the corners thereof. In the illustrated example, rubber foot pads 34 are shown installed in the holes 12, however it should be understood that, alternatively, threaded bolts may be installed through the holes 12 for mounting and supporting the vise on various support surfaces.

As with the previously described embodiment the integrally formed pedestal 13A extends a short distance upward from the top surface of the support base 11 near one end thereof, and the upper end of the pedestal 13A has a yoke portion 14 defined by a vertical flat shoulder (as shown previously in FIG. 2) and a pair of parallel laterally spaced mounting ears 16 extending a short distance outwardly therefrom toward an end of the support base 31. The mounting ears 16 of the yoke portion 14 are each provided with a transverse hole disposed in axially aligned laterally opposed relation for receiving a pivot pin 17 which is secured by a lock washer 17A.

In the embodiment of FIG. 7, an elongated gripping handle 51 extends a distance diagonally outward and angularly upward from the pedestal 13A above the support base 11 and has a contiguous elongate horizontal hand grip portion 52 with a downturned outer end 53 which terminates in a generally rectangular support foot 54 disposed in the same plane as the support base 11 and spaced a distance horizontally outwardly therefrom. Holes 12 disposed near the outer corners of the support foot 54. In the illustrated example, rubber foot pads 34 are shown installed in the support foot holes 12, however it should be understood that, alternatively, threaded bolts may be installed through the holes for mounting and supporting the vise on various support surfaces.

As with the previously described embodiments, an arcuate bottom jaw 18 is secured to the top end of the pedestal 13A above the yoke portion 14 and has an upwardly curved arcuate face 19 provided with a plurality of serrated teeth 20 which extend transversely across, and radially outwardly from, the arcuate face. A curved pivotal jaw member 21 having a mounting end 21A and a jaw end 21B is pivotally mounted at the mounting end 20 between mounting the ears 16 of the yoke portion 15 by the pivot pin 17. The underside of the pivotal jaw member 21 is provided with first and second jaw faces 21C and 21D, disposed adjacent to one another, and at an angle relative to one another, each having a plurality of serrated teeth, respectively which extend transversely across, and downwardly from, the jaw faces. More particularly, the first toothed jaw face 21A is disposed in an upward slightly curved plane and the second toothed jaw face 21B is disposed in a wide inverted "V" shaped plane and they are adjoined by an intermediate short V-shaped serrated toothed surface 21C.

As previously described and shown reference to FIG. 2, a torsion spring 22 having a U-shaped end 22A engaged on the vertical flat shoulder 15 in the yoke portion 14 of the pedestal 13 and a pair of legs extending therefrom that are coiled around the pivot pin 18 on opposite sides of the mounting end 21A of the pivotal jaw member 21 and their ends are engaged against a raised shoulder 21F on the jaw member. Thus, the torsion spring 22 biases the pivotal jaw member 21 toward the closed position, as shown in FIG. 7.

This embodiment of the of the portable pipe gripping torque vise may be easily mounted or supported on a flat support surface and is suitable for use in gripping circular members having an outside diameter ranging from about ⅜" to about 2", and 1.5" fittings, and the increased length of the elongate gripping handle allows for maximum leverage.

Figure 8:
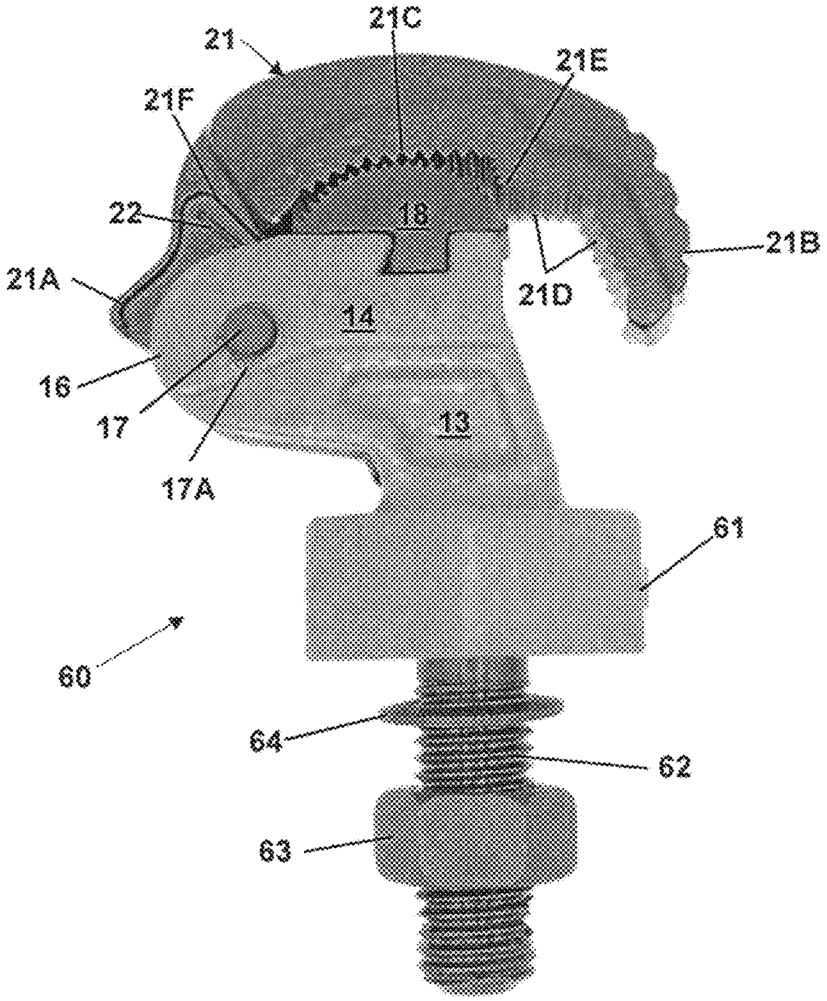
FIG. 8 is a side elevation view of a fifth embodiment of the portable pipe gripping torque vise in accordance with the present invention having a hexagonal support base with threaded rod extending vertically downwardly therefrom configured to be mounted on a trailer hitch ball mount.

Referring now to FIG. 8, there is shown a fifth embodiment of the portable pipe gripping torque vise 60 in accordance with the present invention, shown with the pivotal jaw member in a closed position. This embodiment of the portable pipe gripping torque vise is similar to the first embodiment of FIGS. 1-4, but has a modified support base 61. The components that are the same as those previously described above with reference to the previous embodiments are assigned the same numerals of reference, but some of the components may not be shown or described again in detail to avoid repetition.

In this embodiment, the support base 61 has a hexagonal configuration with a threaded shank portion 62 extending downwardly therefrom for receiving a washer 63 and a nut 64. The threaded shank portion 62 is configured to be received through a hole of a trailer hitch ball mount (not shown) of a type well known in the art and secured by the nut 64 and washer 63.

As with the previously described embodiments an integrally formed pedestal 13 extends a short distance upward from the top surface of the support base 61, and the upper end of the pedestal 13 has a yoke portion 14 defined by a vertical flat shoulder (as shown previously in FIG. 2) and a pair of parallel laterally spaced mounting ears 16 extending a short distance outwardly therefrom toward an end of the support base 31. The mounting ears 16 of the yoke portion 14 are each provided with a transverse hole disposed in axially aligned laterally opposed relation for receiving a pivot pin 17 which is secured by a lock washer 17A.

As with the previously described embodiments, an arcuate bottom jaw 18 is secured to the top end of the pedestal 13A above the yoke portion 14 and has an upwardly curved arcuate face 19 provided with a plurality of serrated teeth 20 which extend transversely across, and radially outwardly from, the arcuate face. A curved pivotal jaw member 21 having a mounting end 21A and a jaw end 21B is pivotally mounted at the mounting end 20 between mounting the ears 16 of the yoke portion 15 by the pivot pin 17. The underside of the pivotal jaw member 21 is provided with first and second jaw faces 21C and 21D, disposed adjacent to one another, and at an angle relative to one another, each having a plurality of serrated teeth, respectively which extend transversely across, and downwardly from, the jaw faces. More particularly, the first toothed jaw face 21A is disposed in an upward slightly curved plane and the second toothed jaw face 21B is disposed in a wide inverted "V" shaped plane and they are adjoined by an intermediate short V-shaped serrated toothed surface 21C.

As previously described and shown reference to FIG. 2, a torsion spring 22 having a U-shaped end 22A engaged on the vertical flat shoulder 15 in the yoke portion 14 of the pedestal 13 and a pair of legs extending therefrom that are coiled around the pivot pin 18 on opposite sides of the mounting end 21A of the pivotal jaw member 21 and their ends are engaged against a raised shoulder 21F on the jaw member. Thus, the torsion spring 22 biases the pivotal jaw member 21 toward the closed position, as shown in FIG. 8.

This embodiment of the of the portable pipe gripping torque vise is also suitable for use in gripping circular members having an outside diameter ranging from about ⅜" to about 2", and 1.5" fittings.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A portable pipe gripping torque vise, comprising:

a support base configured to be removably mounted and supported on a support surface;

an integrally formed pedestal extending upwardly from a top surface of the support base terminating in a top end having a yoke portion defined by a vertical flat shoulder and a pair of parallel laterally spaced mounting ears extending a short distance outward therefrom toward a first end of the support base, the mounting ears having axially aligned transverse holes;

an arcuate bottom jaw mounted at the top end of the pedestal, the arcuate bottom jaw having an arcuate upwardly curved toothed surface;

a pivotal jaw member having one end pivotally mounted between the mounting ears of the yoke by a pivot pin extending through the transverse holes and secured by a snap ring;

a torsion spring installed on the pivot pin having a U-shaped end engaged on the vertical flat shoulder in the yoke portion of the pedestal and a pair of legs that encircle the pivot pin on opposite sides of the mounting end of the pivotal jaw member and their ends engaged against a raised shoulder on the jaw member such that the torsion spring biases the pivotal jaw member toward a closed position and is adapted to be manually pivoted from the closed position to an open position;

the pivotal jaw having two adjacent toothed jaw face surfaces on the underside thereof that are disposed at an angle relative to one another that grip and securely hold pipe and fittings of different sizes to effectively resist torque forces as the pipe or fitting is rotated to screw them together or to unscrew them; wherein in use, the pipe gripping torque vise is removably mounted and supported on various support surfaces, the pivotal jaw member is pivoted from a closed position to an open position, either of a pipe or pipe fitting is placed on the arcuate bottom jaw, and the pivotal jaw member is released such that it's angularly disposed toothed first or second jaw faces engage the top of the pipe or fitting supported on the toothed surface of the bottom jaw and are biased into firm engagement by the torsion spring such that the pipe or fitting is encompassed and gripped at circumferentially spaced locations by the arcuate bottom jaw, and the first and second jaw faces of the pivotal jaw member; and a pipe wrench is used to grip and rotate either the unsupported pipe or fitting to screw them together or to unscrew them, and the rotational force is applied in the direction of the of the pivot pin and as the rotational force is applied, a clamping effect is provided by the toothed surfaces of the arcuate bottom jaw, and the first and second jaw faces of the pivotal jaw member to resist rotation of the clamped member such that the pipe or fitting is effectively gripped and the gripping pressure is increased as force is applied in a torque direction, and said support base provides stability and resistance to the rotational force and allows increased leverage and torque to be applied by the pipe wrench.

2. The portable pipe gripping torque vise according to claim 1, wherein said pivotal jaw having a first toothed jaw face on the underside thereof disposed in an upwardly curved plane and an adjacent second toothed jaw face on the underside thereof disposed in a wide inverted "V" shaped plane adjoined by an intermediate short V-shaped serrated toothed surface.

3. The portable pipe gripping vise according to claim 1, wherein said support base has a rectangular configuration with rounded corners and vertical holes adjacent to the rounded corners configured to receive a threaded bolt for mounting and supporting the vise on flat support surfaces.

4. The portable pipe gripping torque vise according to claim 2, wherein said rectangular support base has an elongate a central portion with a pair of integrally formed mounting legs extending horizontally outward from a first end thereof and three integrally formed mounting legs extending horizontally outward from the opposed second end thereof in the same plane as the central portion and holes near the outer ends of the mounting legs;

wherein either of rubber foot pads are installed in the mounting leg holes, or threaded bolts are installed through the holes for mounting and supporting the vise on various support surfaces.

5. The portable pipe gripping vise according to claim 4, wherein the support base is provided with slots extending therethrough to reduce weight.

6. The portable pipe gripping vise according to claim 1, wherein said support base and vertical pedestal are formed of aluminum and having a narrow support base with a central main portion and a pair of integral mounting legs diverging a short distance angularly outwardly from opposed first and second ends thereof in the same plane as the central portion and holes adjacent to outer ends of the mounting legs, and either of rubber foot pads or threaded bolts are installed in the mounting leg holes for mounting and supporting the vise on support surfaces.

7. The portable pipe gripping vise according to claim 1, wherein said support pedestal has an elongate gripping handle extending horizontally outward therefrom and a downturned outer end terminating in a horizontal rectangular support foot in the same plane as the support base.

8. The portable pipe gripping vise according to claim 7, wherein said rectangle support foot having holes near to the corners thereof and either of rubber foot pads or threaded bolts are installed through the holes for mounting and supporting the vise on various support surfaces.

9. The portable pipe gripping vise according to claim 1, wherein said support base has a hexagonal configuration with a threaded shank portion extending downwardly therefrom for receiving a washer and a nut, and said threaded shank portion sized to be received through a hole of a conventional trailer hitch ball mount and secured thereon by the nut and washer.

* * * * *